United States Patent [19]
Lampe et al.

[11] Patent Number: 5,165,225
[45] Date of Patent: Nov. 24, 1992

[54] TURBINE TEMPERATURE EXHAUST MONITORING SYSTEM

[75] Inventors: Steven W. Lampe; Jack R. Shekleton, both of San Diego; Robert W. Smith, Lakeside, all of Calif.

[73] Assignee: Sundstrand Corp., Rockford, Ill.

[21] Appl. No.: 656,856

[22] Filed: Feb. 19, 1991

[51] Int. Cl.⁵ .............................................. F02G 3/01
[52] U.S. Cl. ..................................... 60/39.33; 374/1; 374/144
[58] Field of Search ...................... 60/39.33, 39.091; 374/1, 144

[56] References Cited

U.S. PATENT DOCUMENTS

| | | |
|---|---|---|
| 2,637,165 | 5/1953 | Stockinger . |
| 2,780,054 | 2/1957 | Coar et al. . |
| 3,046,738 | 7/1962 | Jackson et al. ............... 60/39.091 |
| 3,053,922 | 9/1962 | Schunke ........................ 374/144 |
| 3,060,686 | 10/1962 | Le May et al. ............... 60/39.091 |
| 3,343,417 | 9/1967 | Peek, Jr. . |
| 4,058,975 | 11/1977 | Gilbert et al. ................. 60/39.28 |
| 4,186,605 | 2/1980 | Bourigault .................... 374/144 |
| 4,955,192 | 9/1990 | Shekleton ..................... 60/39.091 |

FOREIGN PATENT DOCUMENTS

| | | | |
|---|---|---|---|
| 0216059 | 8/1988 | Japan .............................. 60/39.33 |
| 0834841 | 5/1960 | United Kingdom ............ 60/39.091 |

*Primary Examiner*—Richard A. Bertsch
*Assistant Examiner*—Michael I. Kocharov
*Attorney, Agent, or Firm*—Wood, Phillips, Van Santen, Hoffman & Ertel

[57] ABSTRACT

In order to control engine operation by exhaust gas measurement, while avoiding operating conditions that exceed the safe maximum temperature limit, a gas turbine engine (10) includes a thermocouple temperature probe (28). The gas turbine engine (10) has a rotary compressor (12), a turbine wheel (14) coupled to the compressor (12) for driven movement thereof, and an annular nozzle (16) proximate the turbine wheel (14) for directing gases of combustion at the turbine wheel (14). It also includes an annular combustor (18) defining an annular combustion space (20) disposed about the turbine wheel (14) and in fluid communication with both the compressor (12) and the nozzle (16). The combustor (18) receives fuel from a source and air from the compressor (12) and it combusts fuel and air in the combustion space (20) to generate the gases of combustion. It further includes an exhaust duct (22) leading from the turbine wheel (14) for exhausting the gases of combustion generated in the combustion space (20) after the gases of combustion have been directed at the turbine wheel (14) by the annular nozzle (16). The exhaust duct (22) directs the gases of combustion axially away from the turbine wheel (14) substantially centered about a centerline (26) thereof. With this arrangement, the thermocouple temperature probe (28) is adapted to measure a mean temperature for the gases of combustion substantially at the centerline of the exhaust duct (22).

13 Claims, 1 Drawing Sheet

TURBINE TEMPERATURE EXHAUST MONITORING SYSTEM

FIELD OF THE INVENTION

The present invention relates generally to gas turbine engines and, more particularly, temperature measurement of exhaust gases from gas turbine engines.

BACKGROUND OF THE INVENTION

Generally speaking, it is well known that there can be large temperature variations in the hot gases generated in a gas turbine engine. This is particularly true, circumferentially, at the entry to a turbine nozzle. As a result, there can be a significant circumferential variation in the temperature of the turbine exhaust flow.

By way of example, the temperature variation can often approach or even exceed 100° F. Since it is important to avoid exceeding the safe maximum temperature permitted for the turbine of a particular engine, it has been common in the past to utilize thermocouples between turbine stages and/or to control engine operation by the measurement of exhaust gases. In this connection, exhaust gases have also commonly been measured by utilizing thermocouples.

In a conventional arrangement, a plurality of thermocouples are strategically positioned to measure the temperature of exhaust gases. This is illustrated, for instance, in Coar et al. U.S. Pat. No. 2,780,054 which provides a switch operable to permit a shut-off valve in a fuel meter to close in the event of excessive temperatures at the turbine discharge. In addition, a plurality of thermocouples could be utilized to provide an accurate average exhaust temperature for operating at optimal conditions.

As will be appreciated, this is one possible manner of dealing with the large temperature variations that typically occur in the hot gases generated in operation of a gas turbine engine. It is clear, however, that, while such an arrangement may function to control the temperature of gases entering the turbine nozzle so as to avoid exceeding the safe maximum for the turbine, it is very expensive and, even then, less then entirely reliable for a number of reasons. In order to avoid the expense, Peek Jr. U.S. Pat. No. 3,343,417 proposes the utilization of a probe that includes a plurality of openings and scoops into which exhaust gas flows.

In the Peek Jr. '417 arrangement, the openings and scoops are provided for the purpose of sensing an average of the exhaust gas temperature. This is said to occur because the scoops are uniformly spaced. Unfortunately, Peek Jr. U.S. Pat. No. 3,343,417 depends upon ideal operating conditions not found in gas turbine engines in actual practice.

More specifically, Peek Jr. '417 proposes a technique which clearly cannot assure averaging of exhaust gas temperatures. The single temperature probe, while extending diametrically of the exhaust duct, is incapable of accounting for the significant circumferential variations in temperature normally encountered. Moreover, Peek Jr. '417 would not be capable of giving a reading that could be calibrated in relation to the mean turbine inlet temperature.

The present invention is directed to overcoming one or more of the foregoing problems and achieving one or more of the resulting objects.

SUMMARY OF THE INVENTION

It is a principal object of the present invention to provide a turbine temperature exhaust monitoring system for a gas turbine engine. It is a further object of the present invention to provide means for measuring a mean temperature for at least a portion of the gases of combustion generated in a gas turbine engine. It is yet another object of the present invention to provide a single or multiple thermocouple temperature probe positioned to measure temperature substantially at the centerline of an exhaust duct.

Accordingly, the present invention is directed to a gas turbine engine comprising a rotary compressor, a turbine wheel coupled to the compressor for driven movement thereof, and an annular nozzle proximate the turbine wheel for directing gases of combustion thereat. The gas turbine engine also includes an annular combustor defining an annular combustion space disposed about the turbine wheel in fluid communication with both the compressor and the nozzle. The combustor receives fuel from a source and air from the compressor and combusts fuel and air in the combustion space to generate the gases of combustion. The gas turbine engine also includes an exhaust duct leading from the turbine wheel for exhausting the gases of combustion generated in the combustion space after the gases of combustion have been directed at the turbine wheel by the annular nozzle. With this arrangement, the gas turbine engine further includes means for measuring a mean temperature for the gases of combustion substantially at the centerline of the exhaust duct.

In an exemplary embodiment, the combustor includes fuel injection means in communication with the source of fuel and from which the combustor receives fuel for combusting with the air form the compressor to generate the gases of combustion in the combustion space. The exhaust duct is suitably a generally tubular component disposed radially inwardly of the annular combustor and leads from the turbine wheel for exhausting the gases of combustion generally axially away from the compressor and the turbine wheel.

In a highly preferred embodiment, the mean temperature measuring means includes a single thermocouple temperature probe positioned to measure temperature of the gases of combustion substantially at the centerline of the exhaust duct. Alternatively, and perhaps even more advantageously, the mean temperature measuring means includes a single probe multi-element thermocouple positioned to measure temperature of the gases of combustion substantially at the centerline of the exhaust duct. Additionally, the gas turbine engine advantageously includes means independent of the mean temperature measuring means for calibrating the mean temperature relative to the temperature of the gases of combustion at the nozzle when the fuel and air are being combusted in the combustion space. Preferably, the mean temperature calibrating means includes at least one thermocouple temperature probe positioned to measure the temperature of the gases of combustion in the exhaust duct radially outwardly of the centerline of the exhaust duct.

Still additionally, the mean temperature measuring means is particularly well suited for utilization in radial flow gas turbine engine applications. The generally tubular exhaust duct then serves to exhaust the gases of combustion generated in the combustion space generally axially away from the compressor and the turbine wheel after the gases of combustion have been radially directed at the turbine wheel by the annular nozzle. For such applications, the temperature probe or thermocouple facilitates mean temperature measurement at the centerline in a calibration-accommodating manner.

Other objects, advantages and features of the present invention will become apparent from a consideration of the following specification taken in conjunction with the accompanying drawings.

DETAILED DESCRIPTION OF THE PREFERRED EMBODIMENT

Figure 1:
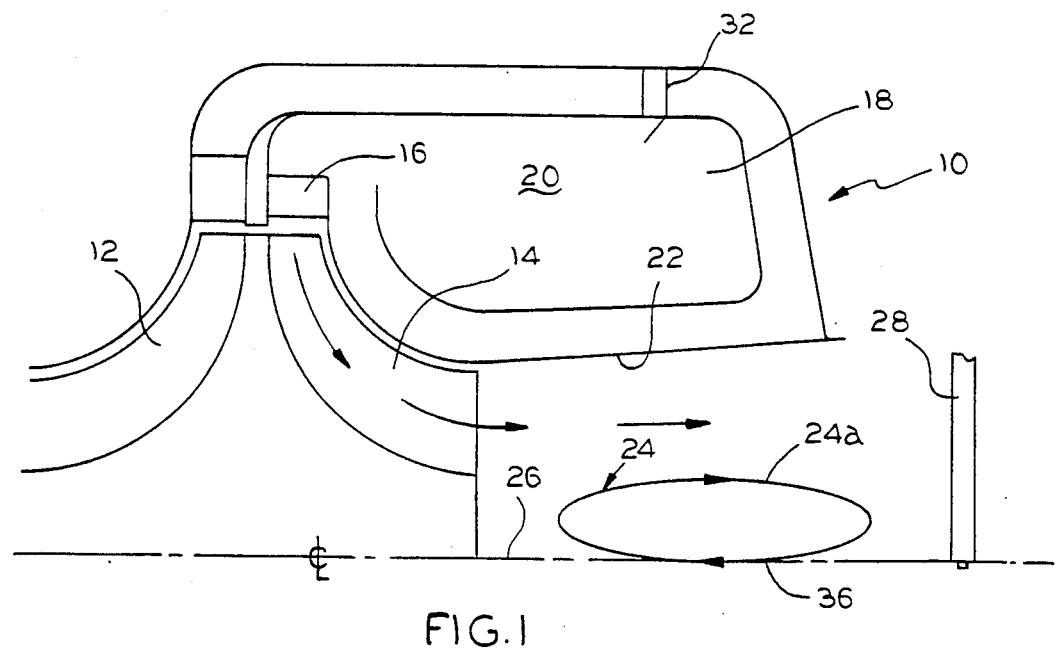
FIG. 1 is a cross sectional view of a gas turbine engine having a turbine temperature exhaust monitoring system in accordance with the present invention; and p

Referring to the drawings, and first to FIG. 1, the reference numeral 10 designates generally a gas turbine engine in accordance with the present invention. The gas turbine engine 10 includes a rotary compressor 12, a turbine wheel 14 coupled to the compressor 12 for driven movement thereof, and an annular nozzle 16 proximate the turbine wheel 14 for directing gases of combustion thereat. An annular combustor 18 defines an annular combustion space 20 disposed about the turbine wheel 14 in fluid communication with both the compressor 12 and the nozzle 16. The combustor 18 receives fuel from a source and air from the compressor 12 and combusts the fuel and air in the combustion space 20 to generate the gases of combustion. The gas turbine engine 10 also includes an exhaust duct 22 leading from the turbine wheel 14 for exhausting the gases of combustion generated in the combustion space 20 after they have been directed at the turbine wheel 14 by the annular nozzle 16. With this arrangement, the gas turbine engine 10 further includes means for measuring the temperature of the gases of combustion.

More specifically, the gas turbine engine 10 includes means for measuring a mean temperature for the gases of combustion substantially at the centerline 26 of the exhaust duct 22. The temperature measuring means comprises a single thermocouple temperature probe 28 positioned to measure the temperature of the gases of combustion substantially at the centerline 26 of the exhaust duct 22. Alternatively, the temperature measuring means may comprise a single probe multi-element thermocouple similarly positioned to measure the temperature of the gases of combustion substantially at the centerline 26 of the exhaust duct 22. By calibrating the mean temperature at this location relative to the temperature of gases of combustion at the nozzle 16, the gas turbine engine 10 can be controlled in a manner so as not to exceed the safe maximum temperature.

Referring once again to FIG. 1, the combustor 18 will typically include a plurality of fuel injectors such as 32 which are all in communication with the source of fuel in a conventional fashion The combustor 18 thus can receive fuel from the fuel injectors 32 for combusting with the air from the compressor 12 to generate the gases of combustion in the combustion space 20. And in a highly preferred embodiment, the gas turbine engine 10 is a radial flow gas turbine engine in which case the gases of combustion are radially directed at the turbine wheel 14 by the annular nozzle 16 as will be appreciated by referring to FIG. 1. The exhaust duct 22 is then preferably generally tubular and disposed radially inwardly of the annular combustor 18. And as shown, the exhaust duct 22 will then lead from the turbine wheel 14 for exhausting the gases of combustion generally axially away from the compressor 12 and the turbine wheel 14. In addition, the gas turbine engine 10 may be such that the exhaust duct 22 develops a zone of recirculation, generally designated 24, for the gases of combustion downstream of the turbine wheel 14.

Figure 2:
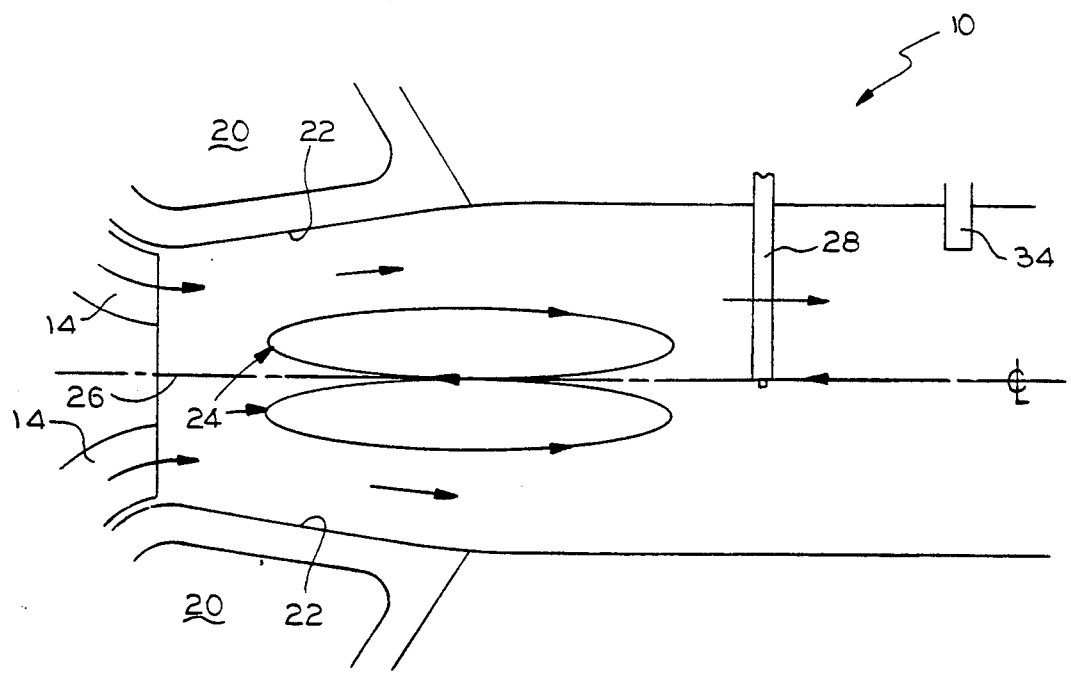
FIG. 2 is an enlarged cross sectional view, similar to FIG. 1, and illustrating the turbine temperature exhaust monitoring system in accordance with the present invention.

Referring specifically to FIG. 2, the zone of recirculation is shown disposed radially inwardly of the exhaust duct 22 and substantially centered about the centerline 26 thereof. Also as shown, the temperature probe 28 is disposed substantially at the centerline 26 of the exhaust duct 22 outside of the recirculation zone 24 although it could be positioned inside the recirculation zone 24, if desired. As for the position of the temperature probe 28, it is presently believed important only that it be located substantially at the centerline 26 of the exhaust duct 22 in order to achieve the advantages of the present invention.

As shown in FIG. 2, the gas turbine engine 10 preferably includes means independent of the single thermocouple temperature probe 28 for calibrating the mean temperature as mentioned hereinabove. More specifically, this may comprise one or more thermocouple temperature probes 34 adapted to be used in a test set-up to calibrate the mean temperature substantially at the centerline 26 within or outside of the recirculation zone 24 as a function of the temperature of the gases of combustion at the nozzle 16 when the fuel and air are being combusted in the combustion space 20. As for the thermocouple temperature probe or probes 34, they are positioned to measure temperature of the gases of combustion in the exhaust duct 22 radially outwardly of the centerline 26 of the exhaust duct 22.

As will now be appreciated, the present invention provides a turbine temperature exhaust monitoring system that is entirely unique. It monitors the mean gas temperature substantially at the centerline 26 of the exhaust duct 22 and, by appropriate calibration and the use of conventional controls, can be utilized to control engine operation so as not to exceed the safe maximum temperature permitted for the turbine wheel 14. Moreover, it achieves this objective by using during normal operation only a single temperature probe.

By way of a specific example for a particular gas turbine engine 10, the optimal mean exhaust temperature might be 1300° F. In the event only a single temperature probe was utilized (whether of the multi-element type or not), and the probe was located at a point away from the centerline 26 of the exhaust duct 22 in a hot region, the thermocouple might, for instance, read 1350° F. By utilizing conventional controls, the gas turbine engine 10 would be caused to run 50° F. under its optimal temperature causing performance loss.

Conversely, if the single thermocouple temperature probe was in a cool region, it might by way of example read 1250° F. This is, again, assuming the location of the single thermocouple temperature probe to be away from the centerline 26. If this should occur, the conventional controls might allow the gas turbine engine to operate 50° F. above its optimal temperature causing shortened turbine life.

However, in accordance with the present invention, the unique attributes of positioning a single calibratable temperature probe at the centerline 26 of the exhaust duct 22 have been fully recognized and successfully utilized for the first time. Hence, by locating a single temperature probe at the centerline 26 of the exhaust duct 22, a low cost yet accurate means for identifying an optimal temperature for turbine operation has been achieved. As will be appreciated, for a given type of gas turbine engine 10, the safe temperature value for the single temperature probe can be established quite accurately by appropriate engine calibration testing as mentioned hereinabove.

Optimally, measurement of the circumferential and radial gas temperature variations can be calibrated against the single temperature probe which is all that need then be present in an operating gas turbine engine. This can be achieved either by measuring such temperature variations at the annular nozzle 16 or, alternatively, by providing one or more thermocouple temperature probes 34 at circumferentially and/or radially spaced locations within the exhaust duct 22 but radially outwardly of the centerline 26. In either case, the gas turbine engine 10 can be calibrated in a manner in which the temperature at the centerline is meaningful in relation to the temperature of the gases of combustion at the annular nozzle 16.

Finally, it will be appreciated that there are significant velocity variations in the exhaust gases of the gas turbine engine 10 in the zone of recirculation 24 and elsewhere. For best results, the single temperature probe is designed for the desired transient response when located at the centerline 26 of the exhaust duct 22, whether within or outside of the zone of recirculation 24.

While in the foregoing there has been set forth a preferred embodiment of the invention for purposes of illustration, it will be appreciated that the details herein given may be varied by those skilled in the art without departing from the true spirit and scope of the appended claims.

We claim:

1. A gas turbine engine, comprising:
   a rotary compressor, a turbine wheel coupled to said compressor for driven movement of said compressor, and an annular nozzle proximate said turbine wheel for directing gases of combustion at said turbine wheel;
   an annular combustor defining an annular combustion space disposed about said turbine wheel and in fluid communication with both said compressor and said nozzle, said combustor receiving fuel from a source and air from said compressor and combusting fuel and air in said combustion space to generate said gases of combustion;
   an exhaust duct leading from said turbine wheel for exhausting said gases of combustion generated in said combustion space after said gases of combustion have been directed at said turbine wheel by said annular nozzle;
   means for measuring a mean temperature for said gases of combustion substantially at the centerline of said exhaust duct; and
   means independent of said mean temperature measuring means for calibrating said mean temperature measuring means to relate said mean temperature to a temperature of said gases of combustion at said nozzle when said fuel and air are being combusted in said combustion space.

2. The gas turbine engine as defined by claim 1 wherein said combustor includes fuel injection means in communication with said source, said combustor receiving fuel from said fuel injection means for combusting with said air from said compressor to generate said gases of combustion in said combustion space.

3. The gas turbine engine as defined by claim 1 wherein said exhaust duct is generally tubular and is disposed radially inwardly of said annular combustor, said exhaust duct leading from said turbine wheel for exhausting said gases of combustion generally axially away from said compressor and said turbine wheel.

4. The gas turbine engine as defined by claim 1 wherein said exhaust duct receives and directs said gases of combustion so as to develop a zone of recirculation with a plurality of gas streamlines from substantially the radially outermost extent thereof at a point just downstream of said turbine wheel.

5. The gas turbine engine as defined by claim 1 wherein said mean temperature calibrating means includes at least one thermocouple temperature probe positioned to measure temperature of said gases of combustion in said exhaust duct radially outwardly of said centerline.

6. The gas turbine engine as defined by claim 1 wherein said mean temperature measuring means includes a single thermocouple temperature probe positioned to measure temperature of said gases of combustion substantially at said centerline of said exhaust duct.

7. The gas turbine engine as defined by claim 1 wherein said mean temperature measuring means includes a single probe multi-element thermocouple positioned to measure temperature of said gases of combustion substantially at said centerline of said exhaust duct.

8. A radial flow gas turbine engine, comprising:
   a rotary compressor, a turbine wheel coupled to said compressor for driven movement of said compressor, and an annular nozzle proximate said turbine wheel for radially directing gases of combustion at said turbine wheel;
   an annular combustor defining an annular combustion space disposed about said turbine wheel and in fluid communication with both said compressor and said nozzle, said combustor including fuel injection means, said combustor receiving and combusting fuel from said fuel injection means and air form said compressor in said combustion space to generate said gases of combustion;
   an exhaust duct disposed radially inwardly of said annular combustor and leading form said turbine wheel for exhausting said gases of combustion generated in said combustion space generally axially away from said compressor and said turbine wheel after said gases of combustion have been radially directed at said turbine wheel by said annular nozzle;
   means for measuring the temperature of said gases of combustion substantially at said centerline of said exhaust duct for calibration relative to the temperature of said gases of combustion at said nozzle; and
   means independent of said temperature measuring means for calibrating said temperature measuring means relative to a temperature of said gases of combustion being directed at said turbine wheel by said nozzle when said fuel and air are being combusted in said combustion space.

9. The radial flow gas turbine engine as defined by claim 8 wherein said exhaust duct is generally tubular and is disposed radially inwardly of said annular combustor, said exhaust duct leading form said turbine wheel for exhausting said gases of combustion generally axially away form said compressor and said turbine wheel.

10. The radial flow gas turbine engine as defined by claim 10 wherein said independent mean temperature calibrating means includes at least one thermocouple temperature probe positioned so as to measure temperature of said gases of combustion in said exhaust duct at a point radially outwardly of said centerline.

11. The radial flow gas turbine engine as defined by claim 8 wherein said temperature measuring means includes a single thermocouple temperature probe positioned to measure temperature of said gases of combustion in said zone of recirculation substantially at said centerline of said exhaust duct.

12. The gas turbine engine as defined by claim 8 wherein said mean temperature measuring means includes a single probe multi-element thermocouple positioned to measure temperature of said gases of combustion substantially at said centerline of said exhaust duct.

13. A turbine temperature exhaust monitoring system for a radial flow gas turbine engine of the type comprising a rotary compressor, a turbine wheel coupled to said compressor for driven movement of said compressor, and an annular nozzle proximate said turbine wheel for radially directing gases of combustion at said turbine wheel, said radial flow gas turbine engine also including an annular combustor defining an annular combustion space disposed about said turbine wheel and in fluid communication with both said compressor and said nozzle, said combustor including fuel injection means, said combustor receiving and combusting fuel form said fuel injection means and air form said compressor in said combustion space to generate said gases of combustion, said radial flow gas turbine engine further including a generally tubular exhaust duct disposed radially inwardly of said annular combustor and leading from said turbine wheel for exhausting said gases of combustion generated in said combustion space generally axially away from said compressor and said turbine wheel after said gases of combustion have been radially directed at said turbine wheel by said annular nozzle, said exhaust duct receiving and directing said gases of combustion axially away from said turbine wheel and substantially about a centerline of said exhaust duct, the system comprising:

means for measuring the temperature of said gases of combustion substantially at said centerline of said exhaust duct; and means independent of said temperature measuring means for calibrating said temperature measuring means to relate the temperature of said gases of combustion substantially at said centerline of said exhaust duct to the temperature of said gases of combustion at said nozzle.

* * * * *